United States Patent [19]

Asayama

[11] 4,433,663
[45] Feb. 28, 1984

[54] ELECTRONICALLY CONTROLLED FUEL INJECTION DEVICE

[75] Inventor: Yoshiaki Asayama, Himeji, Japan

[73] Assignee: Mitsubishi Denki Kabushiki Kaisha, Tokyo, Japan

[21] Appl. No.: 328,545

[22] PCT Filed: Apr. 23, 1981

[86] PCT No.: PCT/JP81/00097
§ 371 Date: Dec. 21, 1981
§ 102(e) Date: Dec. 21, 1981

[87] PCT Pub. No.: WO81/03523
PCT Pub. Date: Dec. 10, 1981

[30] Foreign Application Priority Data

May 26, 1980 [JP] Japan .................................. 55-70574

[51] Int. Cl.³ ............................................ F02B 00/00
[52] U.S. Cl. .................................... 123/494; 123/478; 73/861.22
[58] Field of Search .................... 123/494, 478; 73/194

[56] References Cited

U.S. PATENT DOCUMENTS

| 3,680,375 | 8/1972 | Jey et al. | 123/494 |
| 3,722,275 | 3/1973 | Rodely et al. | 123/494 |
| 3,818,877 | 6/1974 | Barrera et al. | 123/494 |
| 3,881,352 | 5/1975 | McShane | 123/494 |
| 3,956,928 | 5/1976 | Barrera | 123/494 |
| 3,965,730 | 6/1976 | Innes | 123/494 |
| 3,967,596 | 7/1976 | Comley | 123/494 |
| 4,263,884 | 4/1981 | Suzuki | 123/494 |
| 4,336,782 | 6/1982 | Endo | 123/494 |

FOREIGN PATENT DOCUMENTS

| 50-148722 | 11/1975 | Japan | 123/494 |
| 51-130719 | 11/1976 | Japan | 123/494 |
| 54-106720 | 8/1979 | Japan | 123/494 |
| 55-57635 | 4/1980 | Japan | 123/494 |

Primary Examiner—Ronald B. Cox
Attorney, Agent, or Firm—Wenderoth, Lind & Ponack

[57] ABSTRACT

Disclosed is an electronically controlled fuel injection device for an internal combustion engine, in which the Strouhal number is established at a prescribed value to achieve stable idling of the engine. This has not been possible in the prior art because at idling speeds, the injection of fuel into the engine synchronously with the Karman vortex frequency produced an extremely low injection frequency, at which it was not possible to maintain a stable idle.

5 Claims, 2 Drawing Figures

ELECTRONICALLY CONTROLLED FUEL INJECTION DEVICE

TECHNICAL FIELD

This invention relates to electronically controlled fuel injection devices for the internal combustion engines used in automobiles, and in particular relates to electronically controlled fuel injection devices for internal combustion engines which are provided with a Karman vortex flow meter which detects the amount of intake air to the engine, and an electromagnetic valve for injecting fuel which injects fuel synchronously with a frequency output from the Karman vortex flow meter.

BACKGROUND ART

As is generally known, a Karman vortex flow meter produces a frequency output which corresponds to a vortex velocity (number of Karman vortices) which is proportional to the intake air flow to be detected. Methods of injection feeding a fixed quantity of fuel to an engine synchronously with a frequency output proportional to the intake airflow have been proposed in Japanese Utility Model Laid Open No. 133919/1978, and Japanese Patent Laid Open No. 5448/1979.

However, in such Karman vortex flow meters, the Karman vortex frequency f is related to the width d of the vortex generating body, and the airflow velocity v, by the equation $f = St_v/d$. In this equation, St is a constant known as the Strouhal number. This Strouhal number, as shown in FIG. 1, varies in accordance with the Reynolds number, Re, which is proportional to the product of the abovementioned d and v. Accordingly, it is necessary to compensate for the variations in the Strouhal number when fuel is injection fed to engine synchronously with the abovementioned Karman vortex frequency f.

On the other hand, the fuel injection frequency is proportional to the intake airflow, so during idling of the engine, when the intake airflow is small, the injection frequency becomes extremely low, and the idling becomes unstable. Accordingly, for said idling state, consideration could be given to increasing the airflow velocity v, or; to reducing the width d of the vortex generating body, in order to increase the Karman vortex frequency f. However, increasing the airflow velocity v also increases pressure losses, and reducing the width d of the vortex generating body results in the size of the Karman vortices produced being made smaller, making it difficult to detect the Karman vortices, while pulsation of the intake air might disturb the generation of Karman vortices, making it impossible to detect then with accuracy.

DISCLOSURE OF THE INVENTION

This invention eliminates the aforementioned drawbacks of the prior art by making it possible to increase the fuel injection frequency during idling, obtaining for a stable idling, without increasing pressure losses, by providing a fuel injection device for an internal combustion engine which is provided with a Karman vortex flow meter which detects the intake airflow volume of the engine, and an electromagnetic fuel injection valve which injects fuel synchronously with a frequency output, corresponding to the vortex velocity, from the Karman vortex flow meter, the fuel injection device being constituted such that idling of the engine is conducted in the vicinity of a flow speed at which the Strouhal number is substantially a maximum, in the low flow velocity range of the Karman vortex flow meter.

BEST MODE FOR CARRYING OUT THE INVENTION

Figure 2:
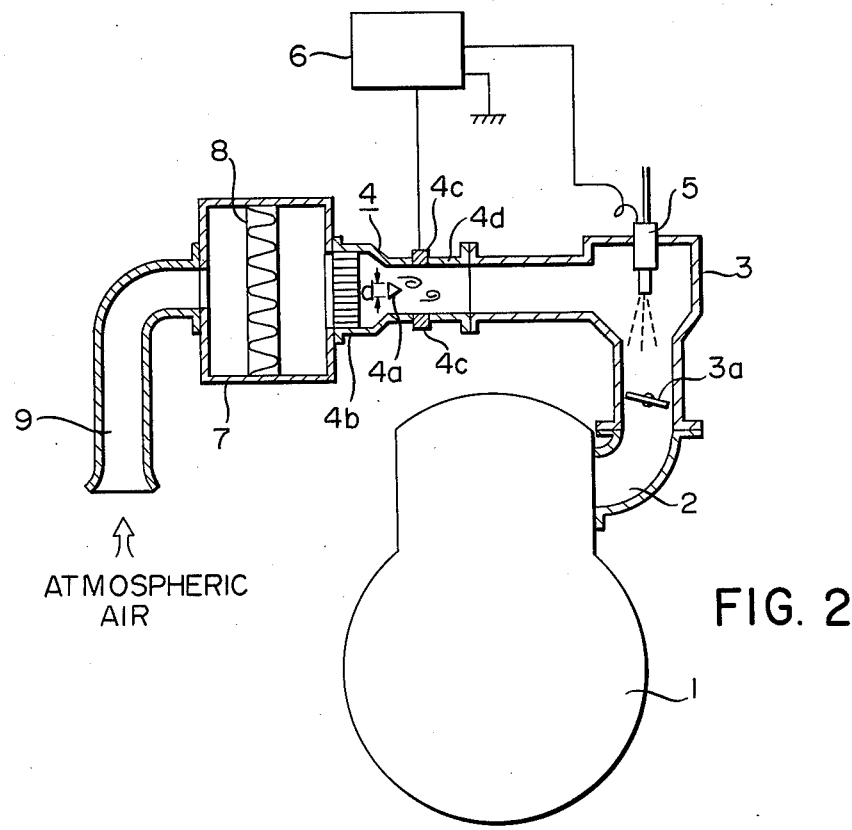
FIG. 2 is a cross-sectional diagram illustrating an embodiment of the present invention.

FIG. 2 is a cross-sectional diagram illustrating a preferred embodiment of the present invention, wherein an intake port (not shown) of an engine (1) is connected in a gas-tight manner via an intake manifold pipe (2) to a mixture chamber (3), from which the passage of an air-fuel mixture is controlled by means of a throttle valve (3a) linked by a suitable linkage mechanism (not shown), to the automobile's accelerator pedal (not shown). Air passes into the mixture chamber (3) from the air cleaner (7) via a vortex flow meter (4) which comprises a vortex generating body (4a) which consists typically of a bar of triangular cross-section, the base of the triangle facing substantially upstream, and the apex of the triangle facing substantially downstream, and which generates vortices in the airflow downstream thereof, an airflow regulator (4b) which regulates the intake airflow passing over the vortex generating body (4a), located upstream of the vortex generating body (4a), and an ultrasonic transmitting and receiving apparatus (4c) which detects the number of aforesaid vortices, housed in a suitable pipe (4d) which is joined in a gas-tight manner at its respective upstream and downstream ends to the aforementioned air cleaner (7) and mixture chamber (3) respectively. The vorticized air passes from the vortex flow meter (4) into the air-fuel mixture chamber (3) where it is mixed with fuel supplied under pressure from a fuel pump (not shown) and injected into the mixture chamber (3) synchronously with a frequency output from the vortex flow meter (4), corresponding to the number of vortices generated, by means of an electromagnetic fuel injection valve (5) extending through the wall of the mixture chamber (3) at a position upstream of the aforementioned throttle valve (3). The means for controlling the synchronous fuel injection from the valve (5) in relation to the frequency output from the vortex flow meter (4) may comprise an electronic control means, shown symbolically by the box (6) in FIG. 2. This electronic control means (6) is arranged to control both the timing and duration of the injection from the electromagnetic fuel injection valve (5). The aforementioned air cleaner (7) joined in a gas-tight manner to the upstream end of the vortex flow meter (4) houses an air cleaner element (8), typically constructed of wax paper, and air is supplied into the air cleaner (7) from the atmosphere via an air intake pipe (9) mounted or joined to the air cleaner (7) upstream of the air cleaner element (8), in a gas-tight manner.

In a device as hereinabove described, the engine is first started up, whereupon intake air passes from the atmosphere through the intake pipe (9), into and through the air cleaner (7) where any dust or other undesirable particles of matter are removed from the air, producing substantially clean air which passes into the vortex flow meter (4). Within the vortex flow meter (4), the volume of intake air is detected by the flow meter, before passing into the mixture chamber (3). Subsequently, a required quantity of fuel is injected into the mixture chamber (3) by means of the electromagnetic fuel injection valve (5) which is activated by the electronic control means (6) synchronously with the frequency output that corresponds to the vortex speed which is proportional to the intake airflow volume detected by the aforementioned vortex flow meter (4). The synchronously injected fuel is thus mixed with the incoming intake air, and the mixture is passed via the throttle valve (3a) into the intake manifold pipe (2) and into the combustion chamber (not shown) of the engine (1) for combustion.

Figure 1:
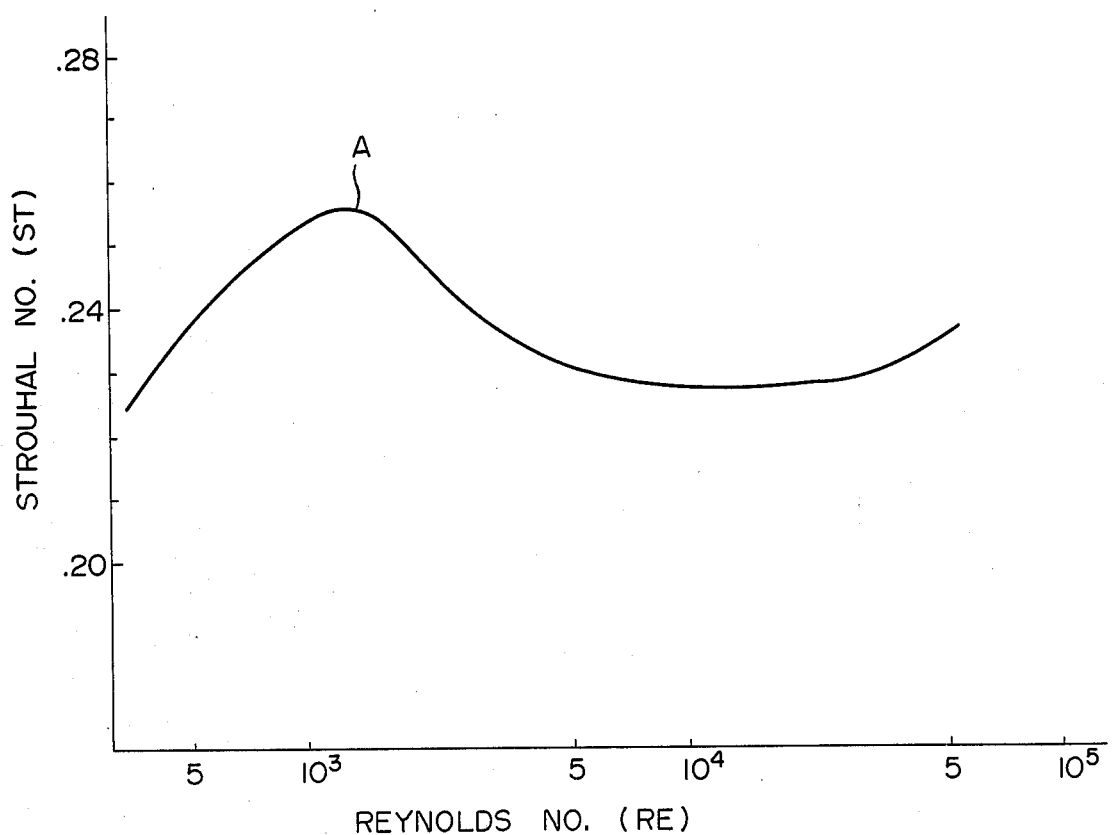
FIG. 1 is a graph showing the relationship of the Strouhal number, St, to the Reynolds number, Re.

In the apparatus hereinabove described, the present inventor has designed the vortex generating body in the light of his observation of the existence of the point A in the graph shown in FIG. 1, at which the Strouhal number is at a maximum in the low velocity region. The vortex generating body is designed so that, at the speed of the intake air at the engine sliding speed, the Reynolds number corresponds to the Reynolds number at; point A in FIG. 1, at which the Strouhal number is at a maximum in the low flow velocity region. Specifically, from the graph in FIG. 1, the Strouhal number is at a maximum with a Reynolds number of approximately 1,300. Thus, to obtain this Reynolds number at the idling speed of the engine, the width d of the vortex generating body (4a) of the vortex flow meter (4) in FIG. 2, may, for example, be approximately 0.9 cm, and the flow velocity v would be approximately 2.1 m/s.

It is known that the Reynolds number R becomes:

$$R = dv/\nu$$

where
d: the width of an object located in a a stream
v: the velocity of flow, and
$\nu$: the dynamic viscosity.

It is also known that the dynamic viscosity $\nu$ of the air is 0.146 cm²/s (at 15° C.). Therefore, assuming the width d of the vortex generator (4a) to be 0.9 cm, the flow velocity v becomes 210 cm/s=2.1 m/s from the above equation.

In this way, according to the embodiment of the present invention it is possible to provide an increased Karman vortex generation frequency, because of the maximum in the Strouhal number, during idling without producing the earlier discussed pressure losses, and without impairing the Karman vortex detection accuracy, whereby instability during idling is eliminated.

As explained hereinabove, the present invention makes it possible to increase the fuel injection frequency during idling, for a stable idle, without increasing pressure losses, in a fuel injection device for an internal combustion engine provided with a Karman vortex flow meter which detects the intake airflow volume to the engine, and an electromagnetic fuel injection valve which injects fuel synchronously with a frequency output corresponding to the vortex velocity, from the Karman vortex flow meter, the fuel injection device being constituted such that idling of the engine is conducted in the vicinity of a flow speed at which the Strouhal number is substantially a maximum in the low flow velocity range of the Karman vortex flow meter.

This invention comprises a Karman vortex flow meter constituted such that the idling of the associated engine is conducted in the vicinity of a flow velocity at which the Strouhal number in the low flow velocity range of the Karman vortex flow meter is substantially at a maximum, the Reynolds number being set at the point (approximately 1,300) at which the Strouhal number is substantially a maximum, although in practice, similar effects are displayed when the Reynolds number is set in the vicinity of the maximum Strouhal number, for instance in the range 800 to 2,000.

I claim:

1. An electronically controlled fuel injection apparatus for an internal combustion engine, comprising:
    a Karman vortex flow meter for detecting the intake airflow volume of the engine and generating a frequency output corresponding to the number of vortexes detected; and
    an electromagnetic fuel injection valve downstream of said flow meter for injecting fuel synchronously with the frequency output from said Karman vortex flow meter, said vortex flow meter having a vortex generating member with a size for, at the air flow speed past said vortex generating member at the idling speed of the engine, giving a Reynolds number in the vicinity of the Reynolds number at which the Strouhal number is substantially a maximum in the low flow velocity range of the vortex flow meter.

2. An electronically controlled fuel injection device as claimed in claim 1, wherein the size of said vortex generating member generates a Reynolds number in the range of approximately 800 to 2,000.

3. An electronically controlled fuel injection device as claimed in claim 2, wherein the size of said vortex generating member generates a Reynolds number proportional to the product of the width of the vortex of approximately 1,300.

4. An electronically controlled fuel injection device as claimed in claim 3, wherein said vortex generating body is substantially triangular in cross-section with the apex facing in the direction of air flow.

5. An electronically controlled fuel injection device as claimed in claim 2, wherein said vortex generating body is substantially triangular in cross-section with the apex facing in the direction of air flow.

* * * * *